Nov. 24, 1970

G. V. HILL

HIGH SPEED CLAMPING APPARATUS EMPLOYING FEEDBACK FROM SAMPLE AND HOLD CIRCUIT

Filed Oct. 30, 1967

3,543,169

INVENTOR
G. V. HILL
BY
G. E. Hirsch Jr.
ATTORNEY

United States Patent Office 3,543,169

Patented Nov. 24, 1970

3,543,169
HIGH SPEED CLAMPING APPARATUS EMPLOYING FEEDBACK FROM SAMPLE AND HOLD CIRCUIT

George V. Hill, Winston-Salem, N.C., assignor to Bell Telephone Laboratories, Incorporated, Murray Hill, N.J., a corporation of New York Filed Oct. 30, 1967, Ser. No. 679,013
Int. Cl. H03k 5/00
U.S. Cl. 328—151 2 Claims

ABSTRACT OF THE DISCLOSURE

The accurate clamping of an applied waveform, to a predetermined reference level during a relatively short interval of time, is accomplished by comparing a stored sampled value of the applied waveform with a predetermined reference voltage. An error voltage is developed, amplified and arithmetically combined with the applied waveform. Clamping is thus achieved by establishing a continuous corrective bias during the period of the signal between sampling reference intervals.

BACKGROUND OF THE INVENTION

1.—Field of the invention

This invention pertains to signal level control apparatus and, more particularly, to apparatus for clamping a broadband video waveform to a reference level.

2.—Description of the prior art

Conventional video clamping circuits, also known as D.C. restoration circuits, may be generally classified as one of two types.

In one type, a pulse activated switch, e.g., a diode, is used to charge or discharge a coupling capacitor during a predetermined reference time interval. If the coupling capacitor is large, as often required in low impedance circuits having good low frequency response, then, necessarily, the reference interval must be long due to the increased charging time constant of the circuit. Thus, accurate clamping may not be accomplished during short reference intervals necessitated by video signals.

A second type of circuit uses envelope detection of the video waveform. Such circuits will operate properly only if the reference level selected is either the most positive or most negative excursion of the video signal. Thus, clamping to a reference level intermediate to the extreme excursions of the signal may not be accomplished.

It is therefore an object of this invention to accurately clamp an applied video waveform to a reference level.

It is another object of this invention to accurately clamp a video waveform to a reference level during a relatively short interval of time.

It is yet another object of this invention to clamp a video waveform to a predetermined reference level intermediate the extreme excursions of the waveform.

Summary of the invention

These and other objects are accomplished, in accordance with the inventive principles described herein, by comparing a stored sampled value of an applied video waveform with a predetermined reference voltage. An error voltage is developed, amplified and arithmetically combined with the applied waveform. Clamping is thus accomplished by establishing a continuous corrective bias during the period of the signal betwen sampling reference intervals.

More particularly, a clamping circuit, in accordance with the principles of this invention, comprises a noninverting amplifier to which is applied the signal to be clamped. A high speed sample-and-hold circuit, responsive to the output signal of the noninverting amplifier, develops a signal, during a very short interval of time, proportional to the magnitude of the applied signal. The stored signal is compared with a predetermined reference voltage and the difference between the two signals is applied, via an inverting amplifier, to the input of the noninverting amplifier. The applied signal is thus compensated by the proper amount necessary to clamp the signal to the desired reference voltage.

These and further features and objects of this invention, its nature and various advantages, will be readily apparent upon consideration of the attached drawings and of the following detailed description of the drawings.

DETAILED DESCRIPTION OF THE INVENTION

Figure 1:
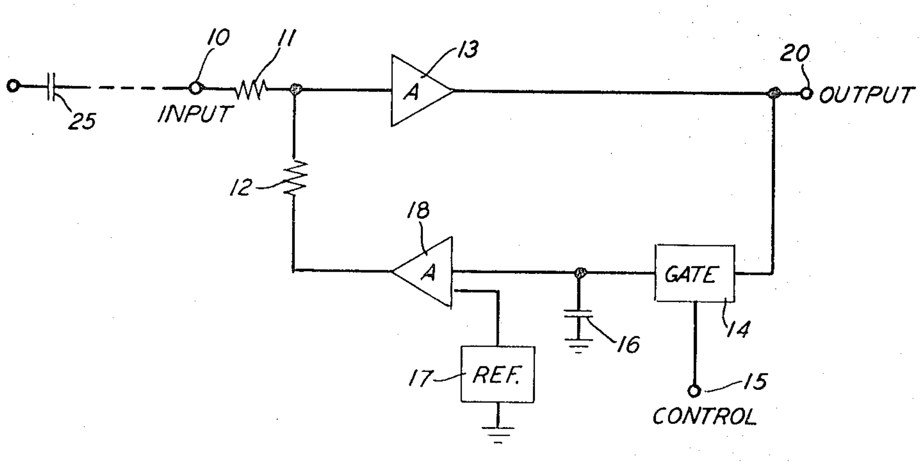
FIG. 1 is a schematic diagram of a clamping circuit in accordance with the principles of this invention.

A video signal which is to be clamped is applied to non-inverting amplifier 13 of FIG. 1 via terminal 10 and input resistor 11. Capacitive coupling of prior stages, indicated by capacitor 25, has, of course, made necessary the D.C. restoration of the applied signal. The signal appearing at output terminal 20 of amplifier 13 is thus an amplified replica of the original applied signal. This output signal is sampled via gate 14 and stored by capacitor 16. Gate 14 and capacitor 16 comprise a conventional sample-and-hold circuit. The sampling control signal applied to terminal 15 of gate 14 activates the gate during predetermined reference intervals. Preferably, sampling takes place during the blanking portion of the video waveform. Of course, any applied waveform, be it video or not, may be sampled during any portion of the waveform. The sampling reference interval need only be long enough to obtain an accurate representation of the magnitude of the output signal. A time interval of approximately 5 nanoseconds has been found to be sufficient.

Figure 2:
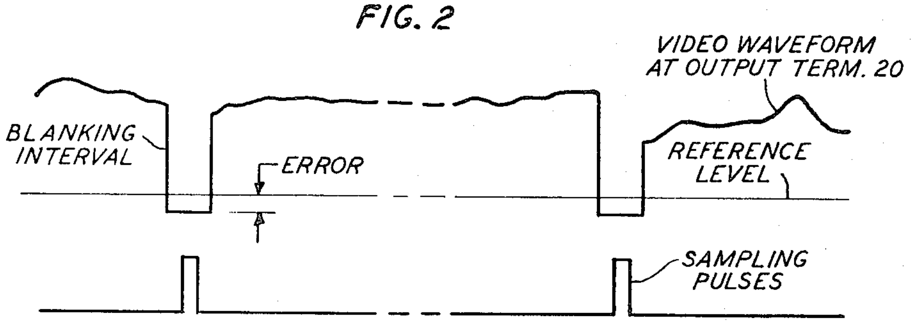
FIG. 2 is a graphical illustration of the clamping operation of the circuit of this invention.

The waveform of FIG. 2 illustrates the clamping operation of the instant invention. It is noted that the blanking interval level of the video waveform differs from the reference level by an amount indicated as an error increment. This error increment is proportional to the difference between the magnitude of the applied signal and the desired reference level.

Returning to FIG. 1, the error signal is developed by differential inverting amplifier 18 which is responsive to the signal stored by capacitor 16 and reference source 17. The difference between these two signals, i.e., the error signal, which is available in amplified form at the output of amplifier 18, is arithmetically combined via resistor 12 with the applied input signal at amplifier 13. Since the error signal has been inverted, it is effectively subtracted from the applied signal by an amount necessary to return the applied signal, in accordance with well-known feedback circuit principles, to the desired reference level, i.e., clamping level. Amplifier 18 is preferably a low-frequency differential amplifier of any well-known type.

Accordingly, a continuous bias is applied to the input amplifier 13, compensating for any errors in the level of the applied signal during the period of time between sampling intervals.

It is to be understood that the embodiments shown and described herein are illustrative of the principles of this invention only and that further modifications of this invention may be implemented by those skilled in the art without departing from the scope and spirit of the invention. For example, the technique of clamping or D.C.

restoration described herein, though particularly suitable to video systems, may find use wherever establishment of a reference level for an applied signal is required.

What is claimed is:

1. A high-speed clamping circuit comprising:
a noninverting amplifier,
means for applying a signal to said noninverting amplifier,
means for sampling the output signal of said noninverting amplifier,
means for storing said sampled signal,
a source of reference potential,
inverting difference amplifier means responsive to said stored signal and said reference potential for developing an error signal,
and means solely responsive to said error signal for continuously altering the magnitude of said applied signal.

2. Clamping circuit apparatus comprising:
means for amplifying an applied signal,
means for sampling said amplified signal during predetermined intervals of time, means for storing said sampled signal,
a source of reference potential,
means responsive to said stored signal and said source of reference potential for developing a proportional difference signal,
and means for algebraically combining said applied signal and said proportional difference signal to continually compensate for differences in magnitude between said applied signal and said reference potential.

References Cited

UNITED STATES PATENTS

| | | | |
|---|---|---|---|
| 3,158,759 | 11/1965 | Jasper | 328—151 X |
| 3,207,998 | 9/1965 | Corney et al. | 328—151 X |
| 3,309,615 | 3/1967 | Baldwin et al. | 328—151 X |
| 3,435,252 | 3/1969 | Eubanks | 307—237 |

DONALD D. FORRER, Primary Examiner

J. D. FREW, Assistant Examiner

U.S. Cl. X.R.

307—237; 330—11